United States Patent [19]

Sanderson

[11] 4,430,785
[45] Feb. 14, 1984

[54] METHOD OF MANUFACTURING A MAGNETIC FUEL OR WATER TREATMENT DEVICE

[76] Inventor: Charles H. Sanderson, 3717 Fritcha Ave., Fort Wayne, Ind. 46806

[21] Appl. No.: 409,907

[22] Filed: Aug. 20, 1982

Related U.S. Application Data

[60] Division of Ser. No. 167,921, Jul. 14, 1980, Pat. No. 4,357,237, which is a continuation-in-part of Ser. No. 98,294, Nov. 28, 1979, abandoned.

[51] Int. Cl.³ .................... B21D 53/00; B21K 29/00; B23P 15/26
[52] U.S. Cl. ................... 29/157 R; 29/455 R; 29/505; 29/517; 29/525
[58] Field of Search ............... 29/157 R, 455 R, 510, 29/516, 505, 517, 525; 210/222, 315, 223; 123/119 E; 335/305

[56] References Cited

U.S. PATENT DOCUMENTS

| | | | |
|---|---|---|---|
| 2,149,764 | 3/1939 | Frei | 210/223 |
| 2,370,725 | 3/1945 | Gordon | 29/517 UX |
| 2,690,842 | 10/1954 | Spluvak | 335/305 X |
| 2,910,183 | 10/1959 | Hayes | 210/315 |
| 3,228,868 | 1/1966 | Ruskin | 123/119 E |
| 3,669,274 | 6/1972 | Happ et al. | 210/222 |
| 3,732,616 | 5/1973 | Masrrodonats et al. | 29/510 X |
| 3,951,807 | 4/1976 | Sanderson | 210/222 |
| 4,050,426 | 9/1977 | Sanderson | 210/222 X |
| 4,146,479 | 3/1979 | Brown | 210/222 |
| 4,153,559 | 5/1979 | Sanderson | 210/222 |

FOREIGN PATENT DOCUMENTS 855928 12/1960 United Kingdom ................ 210/222

Primary Examiner—Charlie T. Moon
Attorney, Agent, or Firm—Jeffers, Irish & Hoffman

[57] ABSTRACT

A method for manufacturing a device for the magnetic treatment of fluids including water, liquid and gaseous fuels, propane, oil and the like. An elongate inner tubular casing having a magnet therein is supported within an intermediate casing made of a ferromagnetic material, and a pair of end fittings are connected to opposite ends of the intermediate casing and serve to center the inner casing therein. The end fittings each have a tapered passage therein, and as they are threaded on the ends of the intermediate casing, the ends of the inner casing are guided into the tapered passages and are gradually deformed inwardly thereby so that the tapered passages tightly seat against the ends of the inner casing to prevent radial and axial movement of the inner casing relative to the end fittings. This results in a self adjusting support of the inner casing and avoids crimping or other deformation which may result if the end fittings are threaded too far.

2 Claims, 12 Drawing Figures

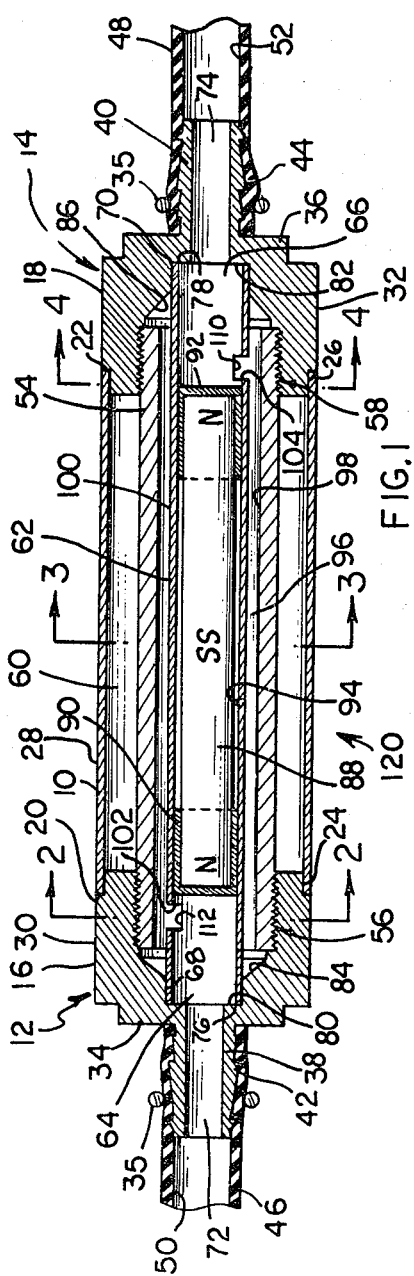
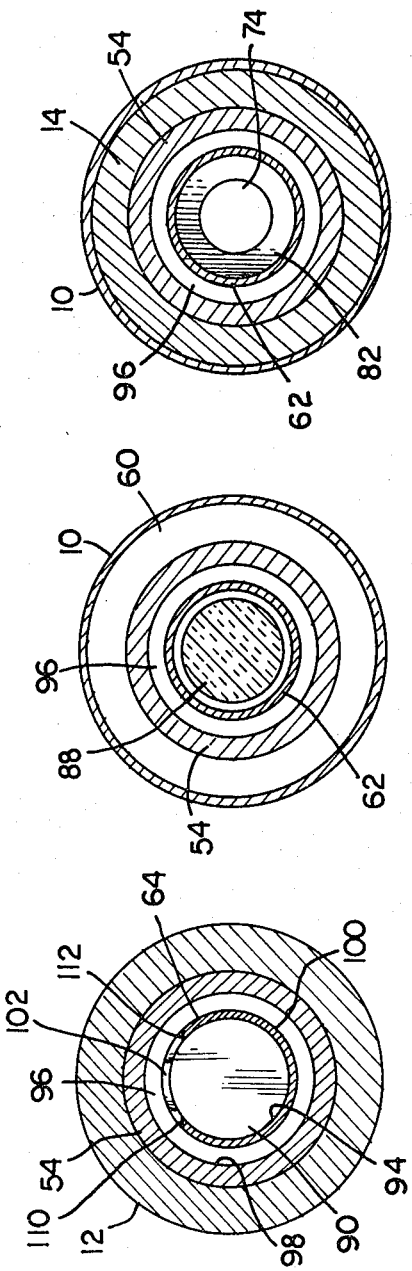

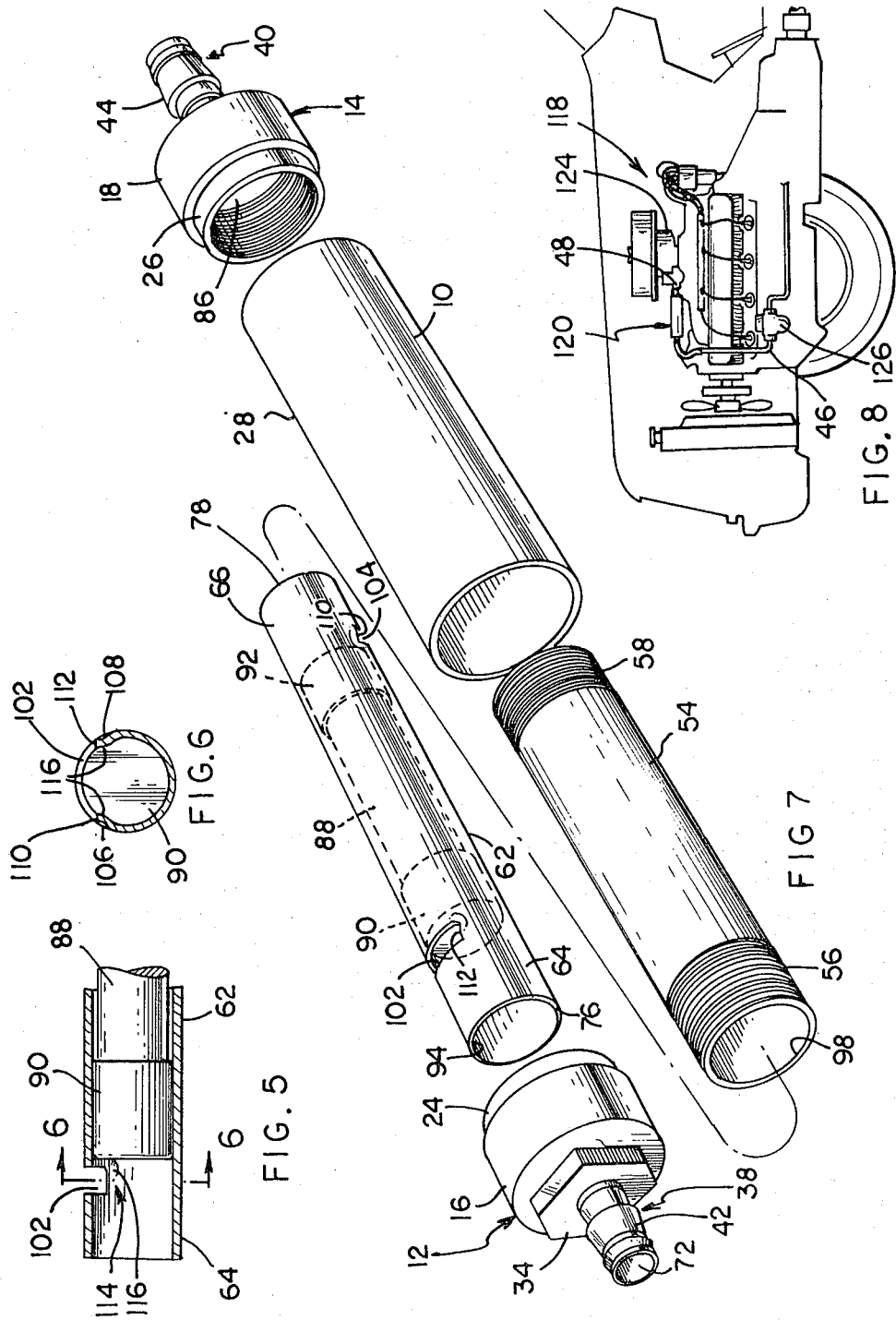

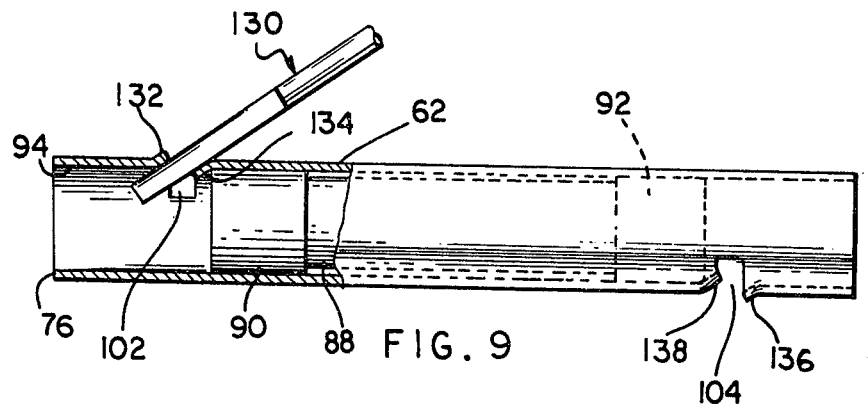
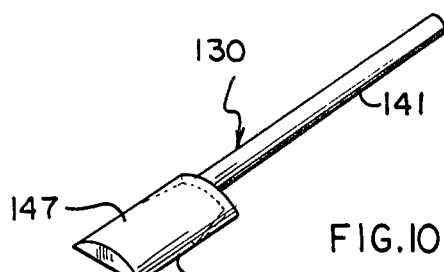
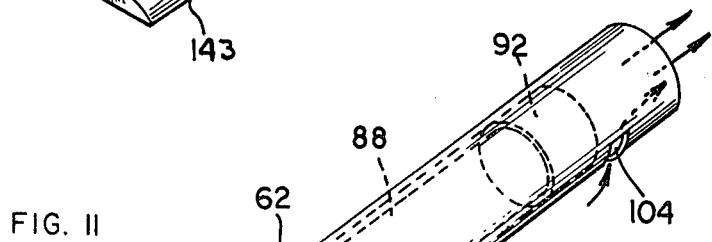
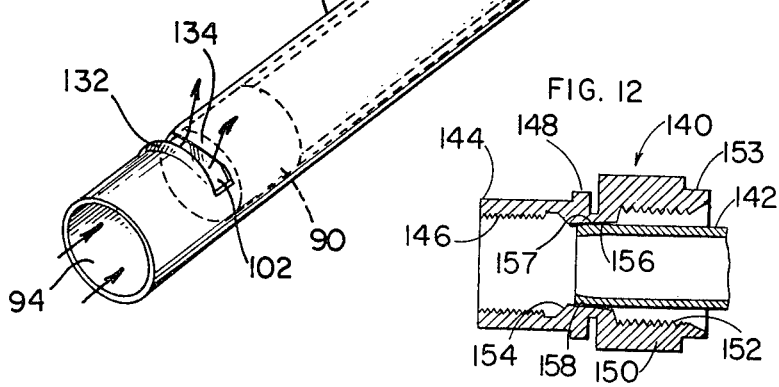

4,430,785

METHOD OF MANUFACTURING A MAGNETIC FUEL OR WATER TREATMENT DEVICE

CROSS-REFERENCE TO RELATED APPLICATION

This is a division of application Ser. No. 167,921, filed July 14, 1980, now U.S. Pat. No. 4,357,237, issued Nov. 2, 1982, which is a continuation-in-part of application Ser. No. 098,294, filed Nov. 28, 1979, now abandoned.

BACKGROUND OF THE INVENTION

The present invention relates to a device for the magnetic treatment of water or reduce the buildup of scale and also relates to a device for the magnetic treatment of liquid and gaseous fuels, such as gasoline, gasahol, diesel fuel, propane, natural gas, oil and the like, in order to improve the efficiency of combustion and reduce the production of air pollutants.

With the energy shortage reaching worldwide proportions, especially with respect to petroleum-based fuels, the need to burn such fuels efficiently has never been of greater importance. Since the automobile is perhaps the largest consumer of petroleum today, significant conservation of gasoline and diesel fuel could be realized if the combustion process were more efficient, thereby enabling greater distances to be driven on a given quantity of fuel. Furthermore, air pollution has increased drastically in recent years due to the expanded use of automobiles and trucks, and there are very significant pressures being placed on industry by governments to produce vehicle engines which emit very low levels of pollutants.

Fuel efficiency and pollution reduction are important, not only in connection with vehicles, but also with heating and electricity generation plants which burn hydrocarbon fuels, such as oil, natural gas, and propane.

Although there has been considerable effort to reduce air pollutants from engines, furnaces, electricity generating installations, and the like, the primary emphasis has been on treatment of the exhaust and stack emissions rather than on devising techniques to burn the fuel more efficiently thereby inherently resulting in the emission of fewer waste products. A beneficial result of more efficient combustion is that the fuel is burned more completely so that fewer hydrocarbon waste products are emitted in the exhaust gases.

The device is useful in increasing the efficiency with which fuel is combusted by treating the raw fuel with a magnetic field. In the case of vehicles, this results in increased mileage, and in the case of heating and energy conversion plants, greater thermal output can be realized for a given quantity of fuel.

The device is also useful for the magnetic treatment of water to reduce the buildup of scale in pipes, fittings and other devices and apparatus through which water flows. A problem which is quite prevalent in systems and apparatus which use large quantities of water, such as boilers, dishwashers, ice machines, and the like, is that of scale buildup on the surfaces which come into contact with the water. This problem is particularly acute in areas where the water has a high mineral content so that it is necessary for the water to be "conditioned" either by chemical action or by magnetic water treatment devices of the general type to which the present invention relates.

One such magnetic treatment device is disclosed in U.S. Letters Patent Nos. 3,951,807, 4,050,426 and 4,153,559. Basically, such device comprises an elongated magnet having a multiplicity of longitudinally spaced poles encased in a non-magnetic jacket and concentrically positioned within a galvanized or black iron casing mode of a magnetic material, such as iron. The jacketed magnet may be centered by means of a pair of stepped collars secured thereto which, in turn, are centered by means of a pair of layered inserts. Alternatively, the jacketed magnet may be centered by means of resilient, tapered sleeves, which are wedged between the jacket for the magnet and the galvanized casing.

Magnetic treatment devices generally of this type are well known and prevent corrosion and the buildup of scale by causing the calcium and other minerals present in hard water to form, instead, a loose slurry which can be removed easily from the system by blowdown or flushing. In many applications, such as furnace humidifiers, for example, it is important for the device to be contained within a fairly small housing, and for this reason, available space is at a premium. Furthermore, the effectiveness with which the water is treated depends on the intensity of the magnetic field within the treatment chamber and the effective length of the chamber itself. Accordingly, it is desirable that the chamber be free of any obstructions which may occupy otherwise available treatment space, and for the water to be directed into and completely occupy the treatment chamber as quickly and in as short a distance as possible after it enters the device.

A further consideration is that the strength of the magnetic field produced by the magnet be confined solely to the annular treatment chamber so that all of the available flux will be utilized. An important factor is ensuring this situation is to completely magnetically isolate the magnet from the supporting structure and to complete the magnetic circuit by means of a ferrous casing which surrounds the magnet, and which is also magnetically insulated from the magnet.

In the aforementioned U.S. Pat. No. 4,153,559, the magnet structure is disclosed as being centrally supported within the ferrous casing by means of a pair of non-magnetic, elastic sleeves compressed between and in frictional engagement with the magnet structure and the ferrous casing at opposite ends thereof. Additionally the magnet is frictionally retained within its jacket by a pair of plastic end caps which further insulate the magnet and also serve to prevent water from coming into contact with it thereby causing corrosion. The ends of the inner casing were flared outwardly partially around the ends of the elastic sleeves so as to provide a positive-type lock intended to prevent axial movement between the inner casing and the sleeves.

Although the frictional engagement between the inner casing and plastic end caps and between the inner casing and the elastic sleeves serves to hold the structure in proper position in normal use, a severe jolt to the unit, as by dropping it during shipping or installation, may cause the magnet to shift axially thereby partially or completely blocking one set of the apertures. Obviously, this would prevent the proper flow of water or fuel through the device. Furthermore, it is possible for the inner casing and elastic sleeves to shift as a unit relative to the ferrous casing, and this may also result in partial or complete blockage of one set of the apertures and/or cause the previously annular treatment chamber to become distorted thereby reducing the effectiveness with which the magnetic field treats the water or fuel.

Axial shifting of the magnet and the magnet-casing structure may also be caused by a severe water hammer occurring in the water supply system, when the device is being utilized as a water conditioner.

One embodiment constitutes an improvement to the devices disclosed above in that the inner casing in which the magnet is encased has its opposite, tubular ends received within recesses in the end fittings, which are dimensioned to provide a snug engagement and to positively lock the inner casing against axial movement relative to the fittings. Since the inner casing is retained immobile relative to the end fittings, which are threadedly secured to the ferrous casing, these elements are maintained in their proper spatial relationship regardless of trauma to the device. This arrangement also provides for less pressure drop because the liquid flows directly into the inner casing with minimal turbulence.

Although receiving the tubular end of the inner casing within recesses in the end fittings positively locks the inner casing against longitudinal movement relative to the end fittings and ferrous casing, on some occasions, difficulty has been encountered in assembling the unit. If the end fittings are screwed on the ferrous casing past the point where the ends of the inner casing are contacted by the bottoms of the recesses in the end fittings, the inner casing will be axially deformed. If this occurs, it is possible that the inner casing could buckle outwardly thereby reducing the volume of the annular treatment chamber, and even exposing the magnet to the flow of liquid if the liquid-tight seal between the inner casing and the end caps supporting the magnet is disrupted.

As an alternative, the recess in each of the end fittings is replaced by a tapered passage, which has a minimum inner diameter less than the outer diameter of the inner casing, and its maximum inner diameter greater than the outer diameter of the inner casing. Thus, as the end caps are screwed onto the ferrous casing, the tapered passages contacts the ends of the inner casing and deform the ends radially inward to a slight degree. This causes the inner casing to seat uniformly on the end fittings and provides a tight seal between the inner casing and the end fittings. Furthermore, the inner casing is prevented from shifting axially because it is tightly compressed by the end fittings. It is generally desirable that the tapered passages continue beyond the axial outer ends of the inner casing so that any further axial shifting of the inner casing will be opposed as the ends thereof are further compressed by the tapered passages.

In order to prevent the magnet from shifting axially relative to the inner casing, portions of the tubular end portions of the inner casing are deformed inwardly so as to form locking projections which would engage the capped magnet and prevent it from moving axially. This, together with the seating arrangement for the inner casing, maintains structural integrity of the unit capable of withstanding severe jolts sustained when dropped during shipping or due to a water hammer when the device is employed as a water conditioner. The structural arrangement according to the invention is also advantageous when the device is used as a fuel treater in vehicles, because the repeated and sometimes severe jolts to the engine as the vehicle traverses rough terrain may otherwise result in movement between the elements making up the device.

Specifically, the device comprises: an elongated, tubular intermediate casing of magnetic materials; an elongated magnet having opposite ends and at least two axially spaced poles; an inner casing of non-magnetic material encasing the magnet and having open, tubular end portions extending beyond opposite ends of the magnet; and a pair of end fittings connected to opposite ends of the intermediate casing and having externally open fluid passages therein. Each of the end fittings includes a recess spaced from and opening toward the magnet with respectively opposite tubular end portions of the inner casing received therein so as to radially space the inner casing from the intermediate casing thereby forming an annular treatment chamber therebetween. The recesses are in fluid communication with the fluid passages of the respective end fittings, and apertures are provided in each of the tubular end portions so as to form fluid flow paths from within the tubular end portions to the treatment chamber. An outer casing made of copper or other suitable material is received on turned down shoulders on the end fittings and is spaced outwardly from the intermediate casing. This serves to prevent the intermediate casing from coming into contact with other ferrous materials when the unit is installed.

In accordance with the invention, wherein the recesses are formed as tapered passages which have a minimum inner diameter less than the outer diameter of the inner casing ends, and a maximum inner diameter greater than the outer diameter of the inner casing ends, as the end fittings are threadedly secured to the ferrous casing, the inner casing ends are pressed inwardly thereby forming a snug fit between the inner casing and end fittings. This prevents movement of the inner casing, both in the axial and radial directions. A further advantage to this embodiment is that the length of the inner and ferrous casings and the extent to which the end fittings are threaded onto the ferrous casing are much less critical. This is because the end fittings and inner casing are not in axial abutment, but the end fittings can continue to slide over the inner casing as they are threaded onto the ferrous casing with the only effect on the inner casing being that of a slight inward deformation.

The outer diameter of the inner casing, a dimension which is sometimes difficult to maintain within tolerances, is also much less critical because the ends of the inner casing are automatically sized as they are deformed inwardly by the tapered passage. This relationship is also advantageous from the standpoint of precisely centering the inner casing within the ferrous casing so as to provide an annular treatment chamber which is perfectly concentric relative to the magnetic field.

BRIEF DESCRIPTION OF THE DRAWINGS

FIG. 1 is a longitudinal sectional view of the magnetic water and fuel treatment device according to one embodiment;

FIG. 2 is a transverse sectional view taken along line 2—2 of FIG. 1 and viewed in the direction of the arrows;

FIG. 3 is a transverse sectional view taken along line 3—3 of FIG. 1 and viewed in the direction of the arrows;

FIG. 4 is a transverse sectional view taken along line 4—4 of FIG. 1 and viewed in the direction of the arrows;

FIG. 5 is an enlarged, fragmentary sectional view of one of the ends of the inner casing which has been inwardly deformed to prevent axial movement of the magnet;

FIG. 6 is a sectional view taken along line 6—6 of FIG. 5 and viewed in the direction of the arrows;

FIG. 7 is an exploded perspective view of the device;

FIG. 8 is a side elevational view showing the device mounted within the fuel line of a typical automobile internal combustion engine.

FIG. 9 is a side elevational view, partially in section, of the magnet and inner casing assembly showing crimping of the apertures;

FIG. 10 is a perspective view of the crimping tool;

FIG. 11 is a perspective view of the magnet and inner casing assembly which has been crimped as shown in FIG. 9; and FIG. 12 is a fragmentary sectional view of one of the tapered passageways.

DETAILED DESCRIPTION

Referring now to the drawings, the magnetic water and fuel treatment device comprises an outer casing 10 made of a non-magnetic material, such as copper, and a pair of substantially identical fluid fittings 12 and 14, also of a non-magnetic material, such as brass. Fittings 12 and 14 are provided with flanges 16 and 18, respectively, which abut opposite ends 20 and 22 of outer casing 10. It will be seen that outer casing 10 is supported on annular shoulders 24 and 26 such that the outer surface 28 of casing 10 is substantially flush with the outer surfaces 30 and 32 of fittings 12 and 14, respectively.

Hexagonal heads 34 and 36 permit fittings 12 and 14 to be tightened by means of a standard wrench, and adapters 38 and 40 are provided with barbed outer surfaces 42 and 44 to facilitate connection with flexible hoses 46 and 48, which may comprise the fuel line of an internal combustion engine, for example. Hoses 46 and 48 are clamped by hose clamps 35. Depending on the particular application for the device, and fittings 12 and 14 may be provided with standard pipe threads for connection to pipe, or compression fittings for connection to thin walled copper pipe or tubing. The last two types of connections would be used when the device is serving as a water conditioner or for the treatment of natural gas or oil in the case of a furnace or heat conversion plant. In the embodiment illustrated, which is particularly adapted for connection in an engine fuel line, the barbed surfaces 42 and 44 dig into the inner surfaces 50 and 52 of tubing 46 and 48 so as to resist disconnection while at the same time permitting easy attachment. Obviously, other types of fittings and connections may be utilized depending on the environment and intended use for the device.

For purposes of the present application, the term "non-magnetic" means materials having a very low magnetic permeability and virtually no ferromagnetic characteristics, such as copper, brass, PVC, nylon and Delrin, for example. "Magnetic" materials are those materials exhibiting high magnetic permeability, such as iron and certain steels.

A tubular intermediate casing 54 of a ferromagnetic material having a high magnetic permeability, such as galvanized iron or steel, is threadedly connected to fittings 12 and 14 by threads 56 and 58. If desired, threads 56 and 58 may be coated with pipe grease or wrapped with Teflon tape to provide a water-tight seal between fittings 12 and 14 and casing 54. Casing 54 has an outer diameter less than the inner diameter of outer casing 10 to form an annular space 60 therebetween.

Positioned within intermediate casing 54 is a tubular inner casing 62 of a non-magnetic material, such as copper, which is open at both ends 64 and 66. Inner casing 62 is received within recesses 68 and 70 in fittings 12 and 14, respectively, which open toward the center of the device and are in fluid communication with passages 72 and 74. Inner casing 62, fittings 12 and 14 and intermediate casing 54 are dimensioned such that, when fittings 12 and 14 are screwed tightly onto intermediate casing 54, the axial edges 76 and 78 of inner casing 62 abut the bottoms 80 and 82 of recesses 68 and 70, respectively. Recesses 68 and 70 are preferably dimensioned such that the ends 64 and 66 of inner casing 62 will be snugly received therein when the device is assembled. Tapering walls 84 and 86 on fittings 12 and 14, respectively, assist in guiding the ends 64 and 66 of inner casing 62 into recesses 68 and 70.

The particular arrangement shown in FIG. 1 causes the liquid to flow directly from passage 72 into inner casing 62 without first flowing into an enlarged chamber, as in the case of certain prior art water conditioners. When liquid flows into an enlarged chamber, the laminar flow pattern is disrupted and turbulence occurs. This results in a greater pressure drop, which reduces efficiency and may require the use of a larger capacity unit. By causing the liquid to flow directly into inner casing 62, laminar flow is generally maintained and loss of pressure is minimized. Also mixing of the liquid with air is reduced.

Retained within inner casing 62 is an elongated permanent magnet 88, preferably having a composition of cobalt, nickel, aluminum, copper and iron, and is magnetized along its longitudinal axis to have a plurality of longitudinally spaced-apart poles of alternate North and South polarity represented by the symbols "N" and "S". Magnet 88 is substantially homogeneous in composition and, in the embodiment illustrated, comprises two magnetic domains extending transversely throughout the magnet and having their magnet moments oppositely aligned such that opposite North and South poles exist along the length of the magnet. A magnet such as this may be produced by imposing on a bar of magnetic material two longitudinally displaced static magnetic fields of opposite polarity. The number of poles for a particular magnet depends to a great extent on the size of the device and on the intended flow rate capacity, so that in the case of a very small capacity device, a magnet having only two poles may be the most efficient. It is preferable that magnet 88 be made of a material having a high energy product and high retentivity and coercivity, such as an Alnico material. Within these desirable constraints, a wide variety of commercially available magnets and magnetic materials may be utilized.

Magnet 88 is provided with a pair of resilient end caps 90 and 92, which are received over the opposite ends thereof and compressed between it and the inner surface 94 of inner casing 62 so as to frictionally retain the magnet 88 in place. When the device is used as a water conditioner, caps 90 and 92 are preferably made of polyethylene, and if the device is used as a fuel treater, they are made of brass. In both cases, the caps 90 and 92 are made of a non-magnetic material so as to magnetically insulate the magnet 88 from the rest of the device. End caps 90 and 92 also serve to space the magnet 88 from the inner surface 94 of the inner casing 62.

Inner casing 62 is centered within intermediate casing 54 so as to form an annular treatment chamber 96 defined by the inner surface 98 of intermediate casing 54 and the outer surface 100 of inner casing 62. In order to permit fluid flow between the interiors of the tubular end portions 64 and 66 of inner casing 62 and the annular treatment chamber 96, apertures 102 and 104 are cut in the tubular end portions 64 and 66, respectively. Apertures 102 and 104 are displaced 180° from each other about the longitudinal axis of the device so that the water or fuel which enters the treatment chamber 96 through one of the apertures will be caused to make a 180° revolution about the axis within chamber 96 before flowing out of the opposite aperture. This allows more of the chamber 96 to be utilized, because otherwise, a portion of the treatment chamber 96 would receive little or no fluid flow. Depending on the flow capacity of the device, additional apertures (not shown) may be cut in the tubular end portions 64 and 66, and if only two additional apertures are so provided, they are preferably aligned diametrally opposite the existing apertures 102 and 104, but apertures 102 and 104 would then be displaced 90° from each other rather than 180°. In most cases, it is desirable that the cross-sectional areas of the passages 72 and 74, apertures 102 and 104, and chamber 96 be selected so as to maintain the pressure drop at a low level for the rated flow capacity of the device.

Although the frictional forces between the plastic or brass end caps 90, 92 and the inner surface 94 of inner casing 62 are generally adequate to prevent axial shifting of the magnet and end cap assembly during normal use, dropping the device on its end during shipping or installation may result in blockage of one of the apertures 102 and 104. This is caused by the magnet and end cap assembly shifting axially over one of the apertures 102 or 104, thereby either completely blocking or substantially reducing the rate of flow through the obstructed aperture 102 or 104 so that the throughput of the device is substantially lowered. In the case where the device is used as a water conditioner, this may result in unacceptable losses in line pressure, and in the case where the device is used as a fuel treater, stalling of the engine due to inadequate supply of fuel to the carburetor or fuel injectors is a possibility.

In order to positively lock the magnet and end cap structure within the inner casing 62, the tubular end portions 64 and 66 of inner casing 62 are crimped inwardly at points 106 and 108 (FIGS. 5 and 6) in the area of the edges 110 and 112 of apertures 102 and 104 (FIGS. 5, 6 and 7). Preferably, the crimped portions are located in the areas indicated by numeral 114 which is the inside corner nearest the magnet 88.

The crimped portions 106 and 108 form inwardly projecting locking protrusions 116 that prevent the end caps 90 and 92 from shifting past the crimped portions 106 and 108 just inside the apertures 102 and 104.

The structure described above is designed to concentrate the magnetic filed produced by magnet 88 in the annular chamber 96 immediately adjacent thereto and at the same time insulate this field from the supporting structure. Due to the high permeability of intermediate casing 54, the flux produced by magnet 88 will extend radially outward therefrom, flowing within intermediate casing 54, and then return to magnet 88 without straying from the treatment chamber 96. By thus containing the magnetic field, maximum efficiency in subjecting the water or fuel flowing through the device to the magnetic field is achieved. Containment of the magnetic field is further enhanced through the use of non-magnetic materials for the outer casing 10, fittings 12 and 14, inner casing 62 and plastic or brass end caps 90 and 92.

The device is assembled by first inserting the magnet 88 within inner casing 62 and then pressing the brass end caps 90 and 92 over the ends of the magnet 88 so that they are compressed between the magnet 88 and the inner surface of inner casing 62. If plastic end caps 90 and 92 are utilized, however, they are first placed over the ends of the magnet 88, and then this assembly is pressed into the inner casing 62. After the magnet 88 and end caps 90 and 92 are in place, the tubular end portions 64 and 66 are crimped as illustrated in FIGS. 5 and 6.

Inner casing 62 is then inserted within the recess 70 of fitting 14, and intermediate casing 54 is loosely screwed into fitting 14. The outer casing 10 is then slipped over intermediate casing 54 and guided onto annular shoulder 26. The other fitting 12 is screwed onto the other end of intermediate casing 54 and, as mentioned earlier, the tapered surface 84 of fitting 12 assists in guiding the end 64 of inner casing 62 into recess 68. Fittings 12 and 14 are then tightly screwed onto intermediate casing 54 until the ends 76 and 78 bottom out against the axial surfaces 80 and 82 of recesses 68 and 70. Outer casing 10 is preferably dimensioned so that it will fit snugly between shoulders 24 and 26 of fittings 12 and 14 when fittings 12 and 14 are tight. The threaded portions 56 and 58 of intermediate casing 54 are preferably tapered slightly so that as fittings 12 and 14 are screwed thereon, a fluid-tight seal is achieved.

FIG. 8 illustrates the manner in which the above-described device may be mounted within the gasoline-fuel engine 118 of an automobile. The fuel treatment device, which is indicated generally by the numeral 120, is preferably connected in the fuel line, which has been severed so as to form portions 46 and 48, as close to the inlet of the carburetor 124 as possible. Thus, as the fuel is pumped from the gasoline reservoir (not shown) by fuel pump 126, it will flow through fuel line 46, passage 72, tubular end portion 64, aperture 102, annular treatment chamber 96, aperture 104, tubular end portion 66, passage 74, and fuel line portion 48 into carburetor 124. As the fuel flows through the annular chamber 96, it is subjected to the high density, substantially radial magnetic field produced by magnet 88. Although the effect of the magnetic field on the fuel is not fully understood, it is believed that this treatment causes the vaporized fuel to disperse more rapidly once it enters the expanded area of the combustion chamber thereby causing more complete combustion resulting in greater fuel efficiency and performance and a reduction of exhaust emissions.

Although not illustrated, the device 120 may also be used in conjunction with a diesel engine by connecting it in the fuel line prior to the fuel filter and the fuel injectors. Furthermore, the device may be used for treating propane, both in vehicles and other installations, as well as natural gas and oil, such as in furnace installations and electricity generating plants. In each case, it is important that the fuel be treated prior to its reaching the air/fuel mixing apparatus, such as the carburetor, fuel injector, nozzle, burner, etc.

As indicated earlier, the device is useful for conditioning or treating water, in which case it is series connected directly in the water supply line, prior to the boiler, humidifier, ice maker, or other apparatus wherein scale is a problem.

The water and fuel treatment device has been shown and described as having an overall shape which is generally symmetrical about a straight axis, but other configurations are not excluded. Although a North-South-South-North arrangement for the poles of magnet 88 have been illustrated in connection with the preferred embodiment, other arrangements, such as South-North-North-South will also be effective. Furthermore, the number of poles can be increased or decreased depending on the space and flow capacity requirements of the device.

FIGS. 9-11 illustrate an alternative technique for locking the magnet and end cap assembly against axial movement within inner casing 62. Similarly to copending U.S. Pat. No. application Ser. No. 121,646 filed Feb. 14, 1980 now U.S. Pat. No. 4,299,700 in the name of Charles H. Sanderson, apertures 102 and 104 may be crimped by means of a tool 130, which is inserted in the apertures as shown in FIG. 9 and pivoted downwardly so as to bend edge 132 of aperture 102 upwardly and bend edge 134 downwardly at angles of 45° relative to the longitudinal axis. Edges 136 and 138 of aperture 104 are similarly deformed.

Inwardly deformed edges 134 and 138 form locking protrusions on the inner surface 94 of inner casing 62 so as to prevent magnet 88 and end caps 90 and 92 from shifting axially. An additional advantage to this configuration is that apertures 102 and 104 are shaped such that they form deflector surfaces which tend to scoop the incoming water or fuel into annular chamber 96, and then scoop the fuel or water out of chamber 96 toward outlet end 66. This provides an easier flow path for the liquid and, therefore, produces less pressure drop than in the case where the liquid must make a right angle turn before it begins to flow in chamber 96 and then another right angle turn as it leaves chamber 96.

FIG. 10 illustrates the crimping device 130 which is used to deform apertures 102 and 104. It comprises a handle 141 adapted to be gripped by the person crimping apertures 102 and 104, and a tool portion 143 having an upper surface 147, which has the same curvature as the inner edge of apertures 102 and 104 when tool 130 is inserted into apertures 102 and 104. If desired the lower surface of portion 143 may taper gradually into a concave surface toward handle 141, as shown in FIG. 10.

As discussed earlier, one of the problems with the embodiment illustrated in FIG. 1 is that tightening of the end fittings 12 and 14 onto intermediate casing 54 is critical because it is desirable that the surfaces 80 and 82 of recesses 68 and 70 just bottom out against the ends 76 and 78 of inner casing 62. If end fittings 12 and 14 are tightened too far on intermediate casing 54, as may be the case if outer casing 10 is too short, inner casing 62 may be buckled at the apertures thereby allowing the inner casing 62 to come in direct contact with the intermediate casing 54. This would cause a partial obstruction in the annular treatment chamber 96, and would result in a reduction in efficiency of the device. Additionally, inner casing 62 may pull away from end caps 90 and 92 thereby exposing the magnet 88 to the liquid. A further difficulty with the embodiment of FIG. 1, is the necessity to have the outer diameter of inner casing 62 be within very close tolerances so that it will not rattle within end fittings 12 and 14.

FIG. 12 illustrates one end of a fuel treater or water conditioner manufactured according to the present invention wherein the ferrous casing and magnet structure have been removed for the sake of clarity. The opposite end structure is identical.

Inner casing 142, within which the magnet (not shown) is supported by end caps (not shown) similarly to the embodiment of FIG. 1, is directly supported by the end fittings 140 so that it is concentrically disposed within the outer casing (not shown). It should be noted that the outer casing, intermediate casing and magnet structure associated with the embodiment of FIG. 12 are identical to that of FIG. 1. End fittings 140 includes a tapered passage 156 which has a generally uniformly decreasing diameter in the axial direction away from the magnet. Thus, as end fittings 140 are threaded onto the ferrous casing by means of threads 152 within portion 150, the ends 158 of inner casing 142 will be deformed radially inwardly as illustrated in FIG. 12. This provides a very snug fit between the outer surface 157 of inner casing 142 and tapered passages 156 so that movement in the radial direction as well as the axial direction is prevented. It will be seen that any axial movement of inner casing 142 relative to end fittings 140 will be resisted because of the compression between inner casing 142 and the tapered passages 156.

Assume, for example, that the outer casing which is supported on annular steps 153 is cut slightly shorter than its optimum length. This will result in end fittings 140 being screwed on the intermediate casing to a greater extent than necessary before the ends of the outer casing bottom against end fittings 140. This presents no problem relative to inner casing 142, however, because it continues to be deformed inwardly so that a tight fit between it and tapered passages 156 will exist at all times. No buckling of inner casing 142 occurs because relative sliding movement between passages 156 and the outer surface 157 of inner casing 142 occurs. In fact, end fittings 140 could even be tightened down to the extent that inner casing 142 would protrude beyond tapered passages 156 into the area defined by tapered surface 154, although this is generally not desirable.

In order to permit inner casing 142 to be easily inserted within tapered passages 156, the larger diameter ends thereof are preferably larger than the outer diameter of inner casing 142. It is necessary that the minimum inner diameter at the axially outer ends of tapered passages 156 be smaller than the outer diameter of the ends 158 of inner casing 142 so that the desired tight fit is achieved. End fitting 140 is provided with a hexagonal portion 148 to permit the end fitting 140 to be screwed onto the intermediate casing. Portion 144 is provided with internal threads 146 for attachment to a standard threaded pipe. Alternatively, the embodiment of FIG. 12 could be configured for attachment to fuel line hose, a compression fitting, or any other liquid conveying means depending on its intended use.

The embodiment of FIG. 12 is assembled by first inserting the magnet 88 within inner casing 142 and then pressing the brass end caps 90 and 92 over the ends of the magnet 88 so that they are compressed between the magnet 88 and the inner surface of inner casing 142. If plastic end caps are utilized, however, they are first placed over the ends of magnet 88, and then this assembly is pressed into inner casing 142. After the magnet 88 and end caps 90 and 92 are in place, the tubular end portions are crimped as illustrated in FIG. 5 in the case of the previous embodiment.

Inner casing 142 is then inserted within the tapered passage 156 of one of the end fittings 140, and the intermediate casing is loosely screwed into threads 152. The outer casing 10 is then slipped over the intermediate casing and guided onto annular shoulder 153. The other fitting 140 is screwed onto the other end of intermediate casing 54, and is guided onto inner casing 142 by virtue of the fact that the maximum outer diameter of tapered passage 156 is slightly larger than the outer diameter of inner casing 142. Fittings 140 are then tightly screwed onto the intermediate casing 54, and as tapered passages 156 are pressed over the ends 158 of inner casing 142, the ends 158 are deformed inwardly by the radial inward tapering forces as illustrated in FIG. 12. End fittings 140 are screwed onto intermediate casing 54 until the flange portions 150 thereof abut the ends of outer casing 10.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A method of manufacturing a magnetic water or fuel treatment device comprising:
    providing an elongate bar magnet,
    providing a tubular inner casing of non-magnetic material having opposite end portions with apertures therein, and inserting the magnet in the inner casing such that the magnet is captured therein between said apertures and held against axial movement relative to the inner casing,
    providing a tubular intermediate casing made of ferromagnetic material having ends and an inner diameter greater than the outer diameter of the inner casing,
    providing a pair of end fittings each having a gradually tapered passage therein wherein the tapered passages have respective maximum inner diameters greater than the outer diameters of the ends of the inner casing and minimum inner diameters less than the outer diameters of the ends of the inner casing, and
    threading the fittings on the ends of the intermediate casing and guiding the ends of the inner casing into the tapered passages thereby causing the ends of the inner casing to be deformed gradually inwardly by the tapered passages as the end fittings are threaded on the intermediate casing, the tapered passages tightly seating against the ends of the inner casing to prevent radial and axial movement of the inner casing relative to the end fittings.

2. The method of claim 1 including the step of placing a tubular outer casing around the intermediate casing and tightening the end fittings against the outer casing as they are threaded on the intermediate casing.

* * * * *